(12) United States Patent
Zhang et al.

(10) Patent No.: US 11,108,744 B2
(45) Date of Patent: Aug. 31, 2021

(54) NETWORK ENCRYPTION METHODS FOR REALIZING ENCRYPTION OF LOCAL AREA NETWORKS AT THE BOTTOM LAYER DRIVER OF NETWORK CARDS OF EMBEDDED DEVICES

(71) Applicant: YEALINK (XIAMEN) NETWORK TECHNOLOGY CO., LTD., Fujian (CN)

(72) Inventors: Huirong Zhang, Fujian (CN); Weiting Wang, Fujian (CN); Hu Jiang, Fujian (CN); Jiexian Zhong, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 92 days.

(21) Appl. No.: 16/745,300

(22) Filed: Jan. 16, 2020

(65) Prior Publication Data
US 2020/0228503 A1 Jul. 16, 2020

(30) Foreign Application Priority Data
Jan. 16, 2019 (CN) .......................... 201910040373.4

(51) Int. Cl.
*H04L 29/06* (2006.01)
*H04L 9/08* (2006.01)
*H04L 9/32* (2006.01)

(52) U.S. Cl.
CPC ........ *H04L 63/0428* (2013.01); *H04L 9/0819* (2013.01); *H04L 9/3234* (2013.01); *H04L 63/162* (2013.01); *H04L 9/3226* (2013.01)

(58) Field of Classification Search
CPC ... H04L 9/0819; H04L 9/3234; H04L 9/3226; H04L 63/0428; H04L 63/162; H04L 63/1491
See application file for complete search history.

(56) References Cited

U.S. PATENT DOCUMENTS

| | | | |
|---|---|---|---|
| 6,922,785 B1 * | 7/2005 | Brewer | H04L 63/0428 380/28 |
| 8,064,599 B2 * | 11/2011 | Little | H04L 9/34 380/255 |
| 9,231,918 B2 * | 1/2016 | Khan | H04L 63/16 |

(Continued)

OTHER PUBLICATIONS

B. Z. Katz, C. Sahin and K. R. Dandekar, "Real-time wireless physical layer encryption," 2016 IEEE 17th Annual Wireless and Microwave Technology Conference (WAMICON), 2016, pp. 1-4, doi: 10.1109/WAMICON.2016.7483851. (Year: 2016).*

*Primary Examiner* — Chau Le

(57) ABSTRACT

Disclosed herein is a network encryption method for realizing encryption of a local area network at the bottom layer driver of a network card of an embedded device. By using such method, an encryption protocol is performed on the network card driver, thereby achieving encryption and decryption of all network data in the network card driver within the local area network, and achieving encryption of all data above network linking layer, so as to achieve unified encryption of all data in the local area network, resulting in enhanced safety of transmission of network data. Moreover, since encryption of the network data is performed in the network driver, developers do not need to focus on encryption situation.

3 Claims, 1 Drawing Sheet

(56) References Cited

U.S. PATENT DOCUMENTS

| | | | |
|---|---|---|---|
| 10,050,867 B2* | 8/2018 | Chan | H04L 69/22 |
| 10,944,550 B2* | 3/2021 | Jenkins | H04L 9/006 |
| 2010/0153701 A1* | 6/2010 | Shenoy | H04L 12/4633 |
| | | | 713/151 |
| 2013/0340067 A1* | 12/2013 | Lindteigen | H04L 63/162 |
| | | | 726/15 |

* cited by examiner

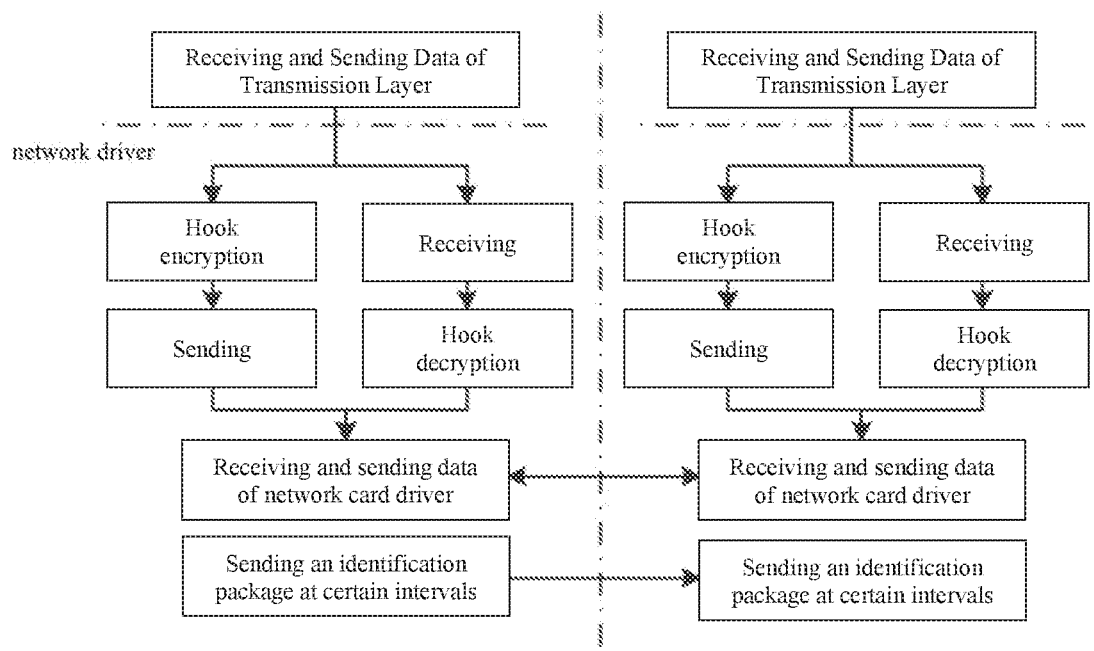

NETWORK ENCRYPTION METHODS FOR REALIZING ENCRYPTION OF LOCAL AREA NETWORKS AT THE BOTTOM LAYER DRIVER OF NETWORK CARDS OF EMBEDDED DEVICES

RELATED APPLICATIONS

This application claims priority to Chinese Application Number 201910040373.4, filed on Jan. 16, 2019, which is herein incorporated by reference.

FIELD OF THE DISCLOSURE

The present disclosure relates to a method for encryption of networks, more particularly, to a network encryption method for realizing encryption of a local area network at the bottom layer driver of a network card of an embedded device.

BACKGROUND OF THE DISCLOSURE

With development of various smart devices, they may need to connect various slave devices to achieve perfect function for the devices. However, when connecting slave devices, it needs to supply dedicated power to the slave devices, resulting in complicated use environment. Therefore, most of the master devices connect the slave devices via networks. Connection via networks is not only for supplying power to the slave devices, but also for achieving data communication between the master devices and the slave devices via networks. Moreover, in certain special situation, it needs to arrange a plurality of devices within a local area network, among which the data communication can be achieved via the network.

With development of network, network safety attracts increasing attention. Developers and users focus on whether data communication among devices is safe enough, or how to prevent communication information from being stolen by a third party. If no encryption is performed on the data when making communication among devices within the local network, the communication data and the communication protocol among devices can be resolved by the third party merely through connecting to the data cables from the network cables or performing packet capture by using HUB.

Currently, encryption of data is performed on the transport layer or on the application layer according to the practical situation for development. However, such encryption method merely achieves encryption of data above IP layer.

SUMMARY OF THE DISCLOSURE

Provided herein is a network encryption method for realizing encryption of a local area network at the bottom layer driver of a network card of an embedded device, resulting in unified encryption of all data in the local area network and improved safety on data transmission.

The method as provided herein comprises the following steps:
Step 1. writing an encryption protocol on a network card driver of a master device, which is used to perform management of the encryption protocol and encryption of network data;
Step 2. initiating a thread by the master device after the network card driver is loaded to the master device, and sending an identification package at certain intervals, which mainly comprises an encryption method, an encrypted key and encryption level;
Step 3. receiving the identification package from the master device by a slave device after the network card driver is loaded to the slave device, and obtaining a real secret key after resolving the identification package according to the encryption method, the encrypted key and the encryption level in the identification package, so as to perform encryption on receiving and sending data by and from the slave device according to the real secret key;
Step 4. hooking out the network data by the network card driver through hook function when the data is sent to the hardware layer, during sending network data from the network card driver of the master device or the slave device, and then performing encryption on the specific data by using the real encrypted secret key obtained by an algorithm according to the encrypted key and the encryption level and sending the encrypted network data to a specified network card after completing encryption; during receiving the network data from the hardware layer of the master device or slave device, hooking out the data by the network card driver through the hook function and then performing decryption on the data by using a real secret key obtained by an algorithm according to the encrypted key and the encryption level, and sending the decrypted data to the network layer to achieve encryption and decryption of receiving and sending the network data.

In one embodiment, in Step 2, the identification package is sent from the master device at an interval of 200 s.

In one embodiment, a proc node is provided in the network card driver.

By using the above method, an encryption protocol is performed on the network card driver, thereby achieving encryption and decryption of all network data in the network card driver within the local area network, and achieving encryption of all data above network linking layer, so as to achieve unified encryption of all data in the local area network, resulting in enhanced safety of transmission of network data. Moreover, since encryption of the network data is performed in the network driver, developers do not need to focus on encryption situation. In addition, since the proc node is provided in the network driver, developers could adjust the encryption level as needed to improve flexibility of data encryption.

BRIEF DESCRIPTION OF THE DRAWINGS

FIG. 1 is a block diagram for illustrating the principle of the present invention.

DETAILED DESCRIPTION OF THE DISCLOSURE

Several aspects of the disclosure are described below in details by reference to appended drawings and specific embodiments. The skilled in the art should understand that the embodiments are set forth to provide an illustration, rather than limit the scope of the present disclosure. The scope of the present disclosure is limited by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Provided herein is a network encryption method for realizing encryption of a local area network at the bottom layer driver of a network card of an embedded device, which comprises the following steps:

Step 1. performing an encryption protocol on a network card driver, which is used for performing management of the encryption protocol and encryption of the network data;

Step 2. initiating a thread by a master device after the network card driver is loaded to the master device, and sending an identification package at certain intervals, which comprises information such as an encryption method, an encrypted key and encryption level and the like, wherein the key is a secret key for storing character information with a size of 128 bytes, through which the master device and the slave device can obtain a real secret key by an unified algorithm;

Step 3. receiving the identification package from the master device by a slave device after the network card driver is loaded to a slave device, and obtaining a real secret key after resolving the identification package according to the encryption method, the encrypted key and the encryption level in the identification package, wherein the real secret key is used to perform decryption of the data from the slave device, so as to perform encryption on receiving and sending data by and from the slave device according to the specific encrypted information;

Step 4. hooking out the network data by hook function when sending the data to the hardware layer, during sending network data by the network card driver of the master device or the slave device, in the case that the master device and the slave device are encrypted, and then performing encryption on the specific data by using a real encrypted secret key obtained by an algorithm according to the encrypted key and the encryption level, and then sending the encrypted network data to a specified network card after completing encryption, during receiving the network data from the hardware layer by the master device or slave device, hooking out the data through the hook function and then performing decryption on the data by using a real secret key obtained from an algorithm according to the encrypted key and the encryption level, and then sending the decrypted data to the network layer to achieve encryption and decryption of receiving and sending the network data.

Specifically, when sending network data by the network card driver of the master device to the hardware layer, the network data will be hooked out by the master device via hook function and then encryption is performed on the specific data by using a real encrypted secret key obtained from an algorithm according to the encrypted key and encryption level. After completing encryption, the network data is sent to a specified network card. when the slave device receives data from the hardware layer, the data is hooked out by the hook function. The data is decrypted by a real secret key obtained from an algorithm according to the encrypted key and encryption level. The decrypted data is then sent to the network layer.

During sending network data by the network card driver of the slave device, the network data will be hooked out by the slave device via the hook function when sending the data to the hardware layer. Then encryption is performed on the specific data by using a real encrypted secret key obtained from an algorithm according to the encrypted key and encryption level. After completing encryption, the network data is sent to a specified network card. The master device receives data from the hardware layer and the data is hooked out by the hook function. Then decryption is performed on the data by using a real secret key obtained from an algorithm according to the encrypted key and encryption level. The decrypted data is sent to the network layer.

In Step 2, the identification package is sent at a default interval of 200 s and the default encryption level is to perform encryption along with transmission layer. If it needs to configure levels, parameters can be transferred at the time of loading driver.

Further, a corresponding proc node is provided in the driver. Proc is a pseudo file system of Linux, which allows interaction between client and internal data of inner core.

Proc node will provide nodes including turning on/off encryption, encryption level, encrypted key, encryption length and the like. The proc node can be used by developers or users to configure information associated with encryption. For example, during development, encryption can be turned off or merely performed on the data above IP layer, for ease of adjustment. Users can configure key as needed and perform encryption of data according to the real encrypted secret key generated in the driver based on the encryption method.

By using the method as provided herein, an encryption protocol is performed on the network card driver, thereby achieving encryption and decryption of all network data in the network card driver within the local area network, and achieving encryption of all data above network linking layer, so as to achieve unified encryption of all data in the local area network, resulting in enhanced safety of transmission of network data. Moreover, since encryption of the network data is performed in the network driver, developers do not need to focus on encryption situation. In addition, since the proc node is provided in the network driver, developers could adjust the encryption level as needed to improve flexibility of data encryption.

The foregoing is provided for illustration, and does not intend to limit the present disclosure. Any changes and modifications for the above embodiments come within the scope of the present disclosure.

The invention claimed is:

1. A network encryption method for realizing encryption of a local area network at the bottom layer driver of a network card of an embedded device, comprising the following steps:

Step 1. writing an encryption protocol on a network card driver of a master device, which is used to perform management of the encryption protocol and encryption of network data;

Step 2. initiating a thread by the master device after the network card driver is loaded to the master device, and sending an identification package at certain intervals, which mainly comprises an encryption method, an encrypted key and encryption level;

Step 3. receiving the identification package from the master device by a slave device after the network card driver is loaded to the slave device, and obtaining a real secret key after resolving the identification package according to the encryption method, the encrypted key and the encryption level in the identification package, so as to perform encryption on receiving and sending data by and from the slave device according to the real secret key;

Step 4. hooking out the network data by the network card driver through hook function when sending data to the hardware layer, during sending network data from the network card driver of the master device or the slave device, and then performing encryption on the specific data by using a real encrypted secret key obtained from an algorithm according to the encrypted key and the encryption level and sending the encrypted network data to a specified network card after completing encryption, during receiving the network data from the hardware layer of the master device or slave device, hooking out the data by the network card driver through the hook function and then performing decryption on the data by using a real secret key obtained from an algorithm according to the encrypted key and the encryption level, and sending the decrypted data to the network layer to achieve encryption and decryption of receiving and sending the network data.

2. The network encryption method for realizing encryption of a local area network at the bottom layer driver of a network card of an embedded device according to claim 1, wherein in Step 2, the identification package is sent from the master device at an interval of 200 s.

3. The network encryption method for realizing encryption of a local area network at the bottom layer driver of a network card of an embedded device according to claim 1, wherein a proc node is provided in the network card driver.

* * * * *